Figure 6:
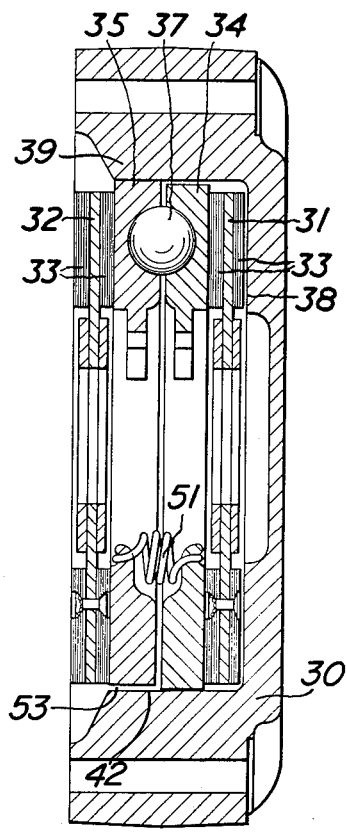

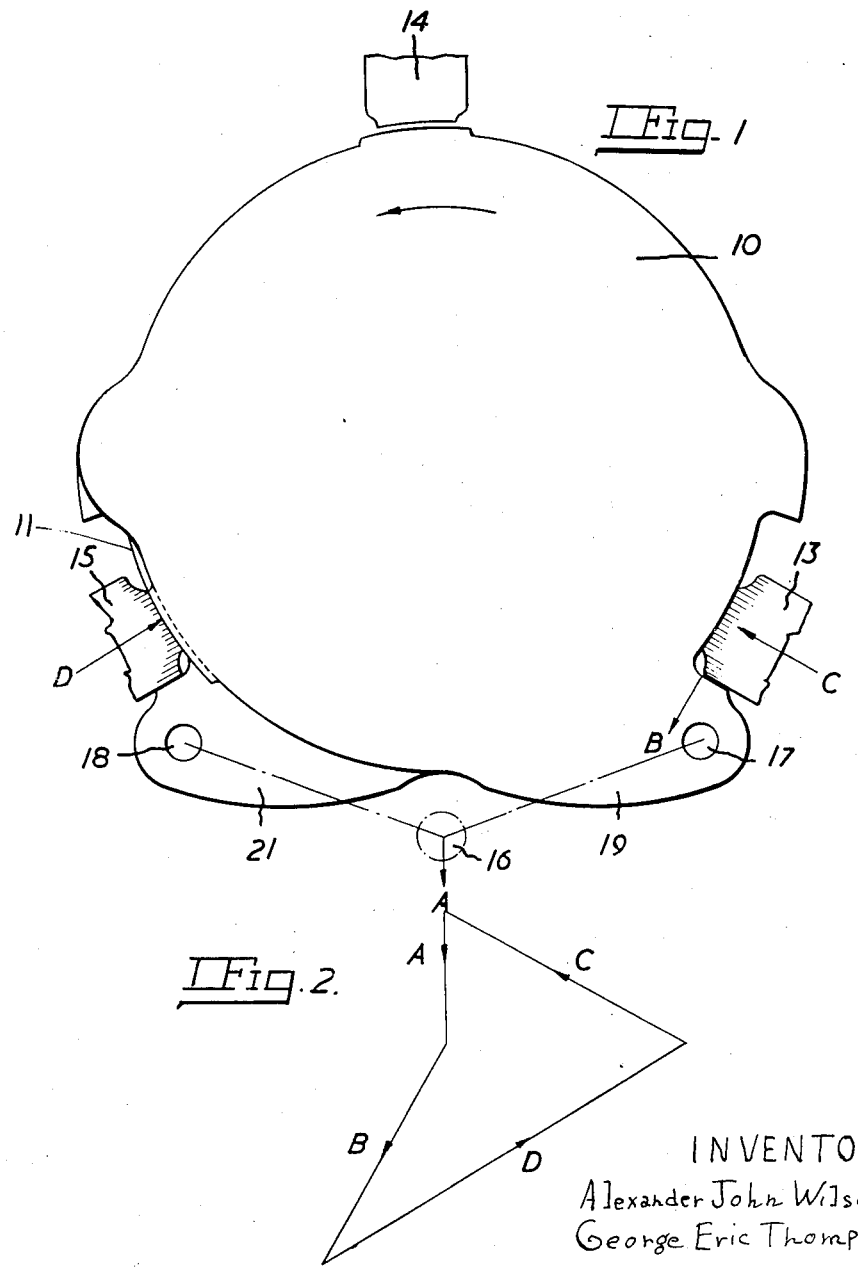

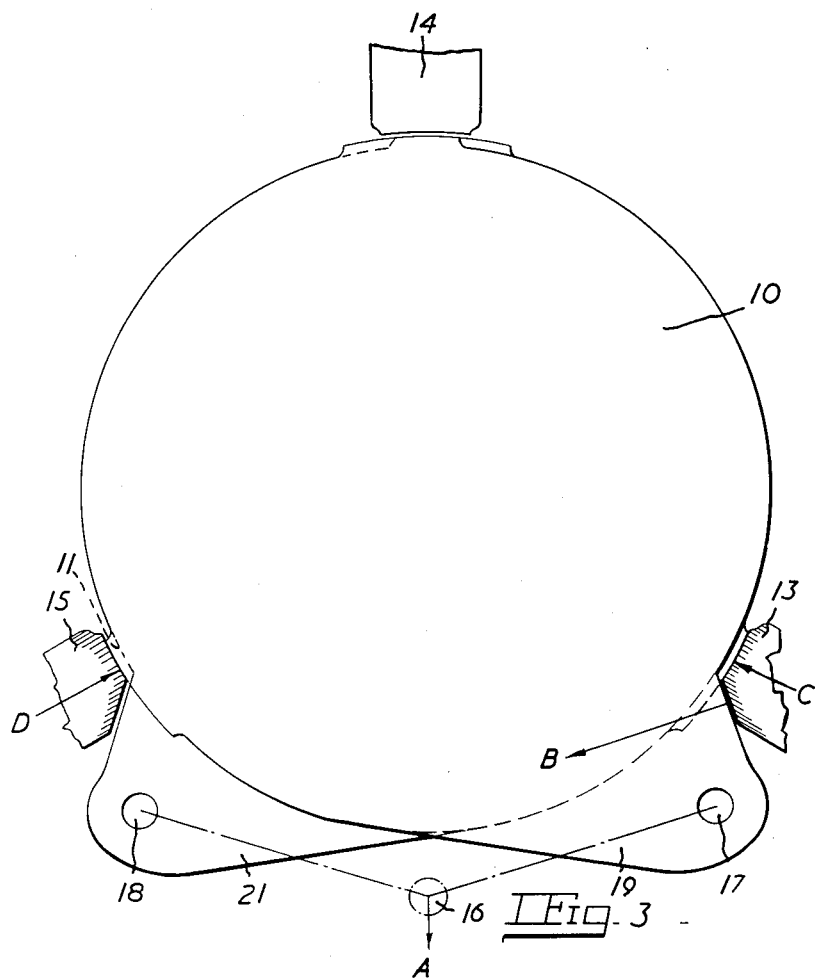

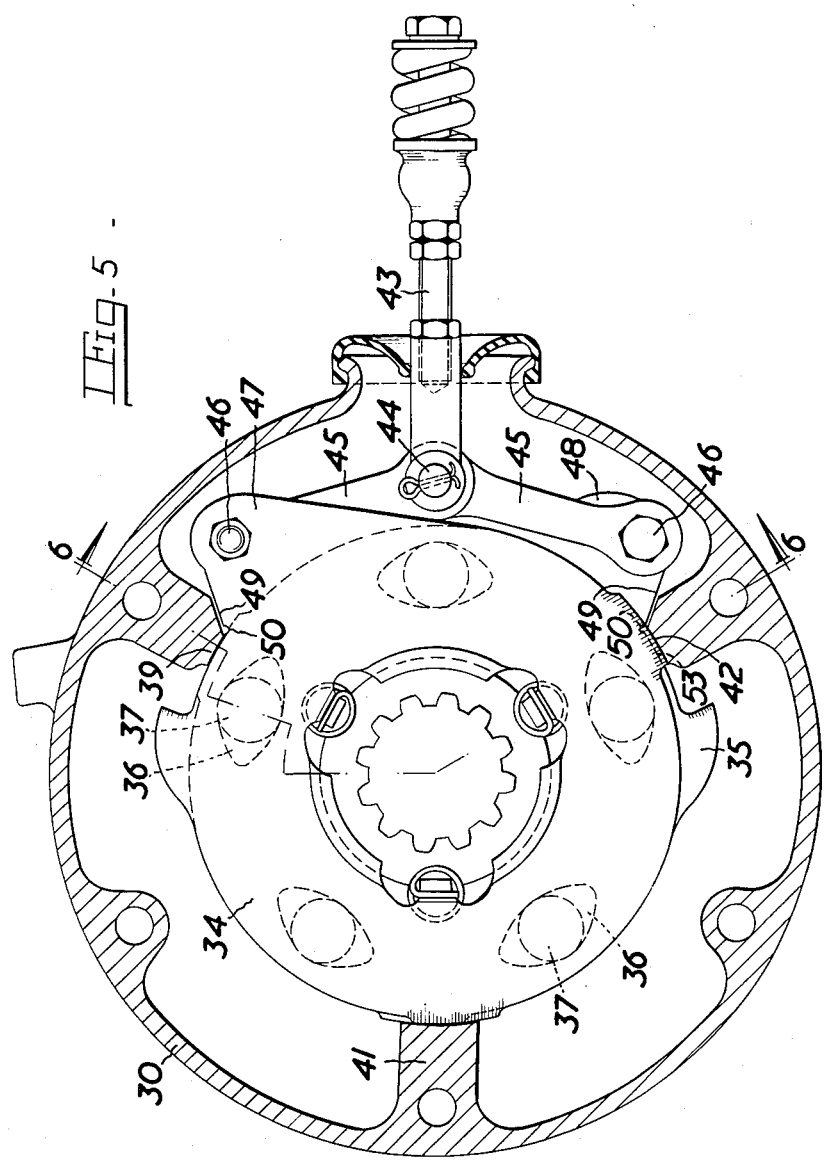

Sept. 7, 1965  A. J. WILSON ETAL  3,204,727
SELF-ENERGIZING, SPREADING TYPE DISC BRAKE
Filed Sept. 16, 1963  5 Sheets-Sheet 5
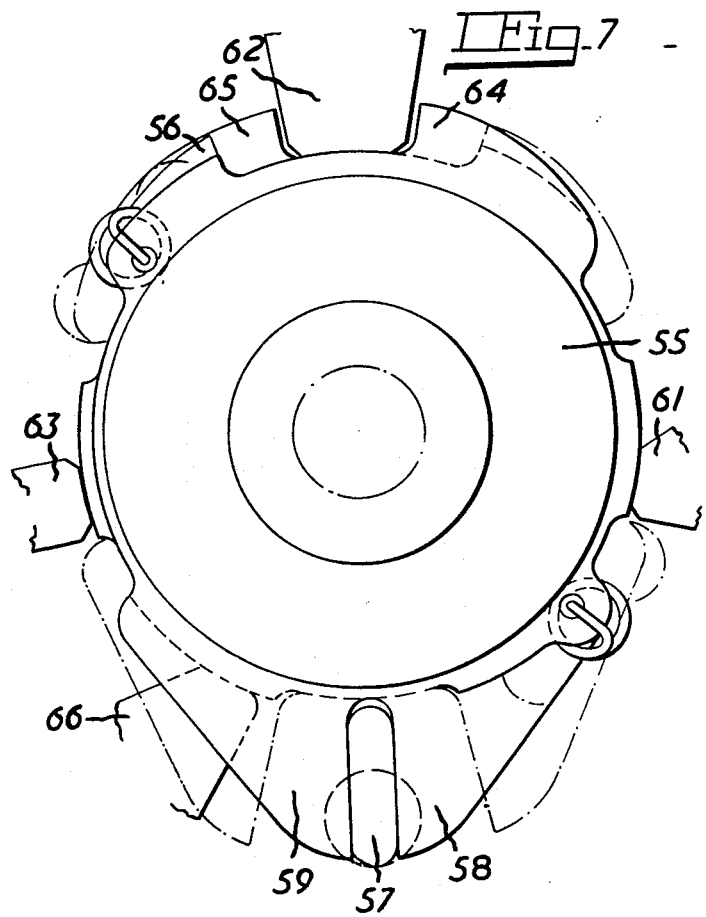
INVENTORS
Alexander John Wilson
George Eric Thompson
BY Scrivener + Parker
ATTORNEYS

United States Patent Office 3,204,727
Patented Sept. 7, 1965

3,204,727
SELF-ENERGIZING, SPREADING TYPE DISC BRAKE
Alexander John Wilson, Sutton Coldfield, and George Eric Thompson, Edgbaston, Birmingham, England, assignors to Girling Limited, Birmingham, England, a British company
Filed Sept. 16, 1963, Ser. No. 308,944
Claims priority, application Great Britain, Sept. 18, 1962, 33,798/62
4 Claims. (Cl. 188—72)

This invention relates to improvements in disc brakes of the kind in which rotatable and non-rotatable members are adapted to be brought into frictional engagement by separation in an axial direction of two co-operating plates or rings between which are located angularly spaced balls located in conical or inclined recesses in the adjacent faces of the plates or rings. The application of the brake is initiated by moving the plates angularly in opposite directions, and the plates then tend to rotate with the rotating members until one plate engages with a stationary abutment on the brake housing which holds it against further angular movement while continued angular movement of the other plate, usually referred to as the "servo" plate, causes the balls to urge the plates apart and to produce a self-energising action to apply the brake.

It is usual to provide in the housing angularly spaced pilot lugs, generally three in number, extending radially inwards to maintain the plates in a central position with respect to the housing, the plates being in sliding engagement with the lugs, and the plates carry radial projections engaging abutment faces on a lug to form a stop for one or other of the plates according to the direction of rotation of the discs.

When angular movement of a plate is arrested in the application of the brake, the plate assembly tends to pivot about the stop abutment and the plates are forced against another of the pilot lugs so that axial movement of both plates and axial and angular movement of the energising or servo plate are impeded and a greater effort has to be applied to the pedal. In some cases if the co-operating surfaces have become corroded after prolonged use the frictional engagement between a plate and a lug may be such that the brake is left locked in the fully applied position when the pedal is released.

According to our invention, in a disc brake of the kind set forth co-operating portions of an angularly movable plate and of the stationary housing are of such a form as to reduce frictional resistance to continued rotation of the plate when it is acting as the servo or self-energising plate.

In one arrangement frictional resistance to continued rotation of the plate is reduced by cutting away the plate adjacent to the pilot lug which takes the reaction on the plates when the brake is applied, while in another arrangement the frictional resistance is reduced by inclining at a suitable angle the faces of the stop projection on a plate and of the abutment with which it engages.

In a preferred arrangement the cutting away of the plate and the inclination of the stop projection and its abutment are combined.

In the accompanying drawings:
FIGURE 1 is a diagrammatic end elevation of a brake of the kind set forth and incorporating normal pilot lugs and abutments,
FIGURE 2 is a force diagram applicable to the brake shown in FIGURE 1,
FIGURE 3 is a diagrammatic elevation of a brake similar to FIGURE 1, but modified in accordance with our invention,
FIGURE 4 is a force diagram applicable to the brake shown in FIGURE 3,
FIGURE 5 is an end elevation of a brake embodying our invention,
FIGURE 6 is a section of the brake on the line 6—6 of FIGURE 5, and
FIGURE 7 is a diagrammatic end elevation of a modified form of brake.

In the brake shown diagrammatically in FIGURE 1, the two co-operating plates are indicated at 10 and 11, the plates being in axial alignment. They are located centrally in a housing by three angularly spaced pilot lugs 13, 14, 15 and the relative angular movement between the plates to initiate the application of the brake is effected by a radial pull applied to a pin 16 coupled by oppositely inclined toggle links (not shown) to pins 17, 18 in lugs 19, 21 projecting from the plates. The pilot lug 14 is diametrically opposite the pin 16. The pilot lugs 13, 15 have substantially radial side faces adapted to form stops for engagement by substantially radial faces on the lugs 19, 21 according to the direction of rotation of the rotating members of the brake.

When the brake is applied the plates 10 and 11 in the arrangement of FIG. 1 are at all times in contact with the pilot lugs 13 and 15 so that forces C and D, representing, in part at least, the reaction to the radial input force A, are always present between the plates and pilot lugs 13 and 15 respectively.

Assuming the direction of rotation to be anti-clockwise the plates are carried round until the lug 19 engages the pilot lug 13 which arrests and prevents further rotation of the plate 10, while the movement of the other plate 11, which is now acting as the servo plate, continues so that the plates are urged axially apart by balls located in inclined recesses in the adjacent faces of the plates.

When the lug 19 engages the pilot lug 13 the torque on the plates causes them to pivot or swing about that lug thereby increasing the force D on pilot lug 15. Under these conditions, part of force D and force C continue as reaction forces to the radial brake applying force A and inasmuch as both plates 10 and 11 are of equal diameter, the forces C and D are shared substantially equally by both plates at the faces of the respective lugs 13, 15.

When the brake is applied, in the equilibrium position the reaction force B between the lugs 19 and 13 acts in the direction of the arrow and is readily calculable. The input force A applied to the pin 16 is radial and is also readily calculable. The forces C and D representing the reactions between the plates and the pilot lugs 13 and 15 respectively are assumed to be perpendicular to the engaging surfaces and to provide the equilibrium position these four forces must have the relative magnitudes shown in FIGURE 2.

As this force diagram shows the forces C and D are very substantial and provide frictional resistance to both angular and axial movements of the plates. These forces are shared between the plates. As is known force is equal to co-efficient of friction multiplied by reaction and therefore the total force is equal to the metal-to-metal co-efficient of friction between the plates 10 and 11 and the pilot lugs 13 and 15 multiplied by the sum of the reaction forces C and D. As the forces are shared between the plates, the resistance to further axial and hence angular movement of the servo or energising plate is of substantial magnitude.

This does not matter so far as the plate 10 is concerned as it is already in engagement with its stop abutment, but continued angular movement of the servo plate 11 is essential for the self-energising action of the brake.

This difficulty is overcome according to our invention by cutting away the servo plate 11 at points where it would normally engage the pilot lug 15 or by inclining the stop abutment for the plate 10 or by both means in combination.

FIGURE 3 is a diagrammatic view similar to FIGURE 1 and the same references have been applied to corresponding parts but in this case the abutting faces of the lugs on the plates and of the lugs 13 and 15 are inclined with respect to a radius passing through the abutment.

When the lug 19 engages the stop lug 13 the reaction force B is in the direction of the arrow and is the resultant of radial and circumferential forces.

The force diagram is now as shown in FIGURE 4 from which it will be seen that the reaction force C to the radial forces A at the pilot lug 13 is reduced to a very low value and the frictional resistance there to angular movement of the plates is correspondingly reduced. The reaction force D is still substantial but by cutting away the plate 11 where it would normally engage the lug 15 the force D is taken by the stationary or servo plate and the actuated plate 11 is only subjected to the frictional resistance due to the force C.

Preferably the angle of the abutments is such that the force C has a positive value to assure that none of the reaction force is taken by the pilot lug 14 and to maintain stability of the brake.

FIGURES 5 and 6 show one practical form of brake embodying our invention. The brake is enclosed in a stationary housing 30 into which extends one end of a rotatable shaft (not shown) on which are splined two axially spaced brake discs 31, and 32, each disc carrying on each side a ring of friction material 33. Located between the discs are plates 34, 35 having in their adjacent faces inclined recesses or ramps 36 in which are located balls 37. On relative angular movement between the plates they are urged apart by the balls in co-operation with the recesses to force them into engagement with the brake discs and to urge the brake discs into engagement with a radial surface 38 on the end wall of the housing and with a similar surface on a cover plate (not shown) bolted to and closing the other end of the housing.

The plates are located centrally in the housing by three angularly spaced pilot lugs 39, 41 and 42 extending inwardly from the housing for co-operation with arcuate surfaces on the periphery of the plates.

The plates are moved angularly in opposite directions to initiate the application of the brake by a radial pull-rod 43 attached to a pin 44 connecting the inner ends of toggle links 45 of which the outer ends are pivotally connected by pins 46 to lugs 47 and 48 on the plates 34 and 35 respectively. Each lug has a straight inclined abutment face 49 for co-operation with a correspondingly inclined face on the corresponding pilot lug.

To prevent fouling of the co-operating surfaces the abutment face 49 is recessed at its inner end as shown at 50 in FIGURE 5, or alternatively the adjacent corner of the pilot lug may be recessed or cut away.

The two plates are urged towards each other by angularly spaced tension springs 51.

When a pull is applied to the rod 43 the links move the plate 34 in a clockwise direction and the plate 35 in an anti-clockwise direction. This causes the balls to urge the plates apart into engagement with the rotating discs. Assuming the discs to be rotating in an anti-clockwise direction the plates move angularly with the discs until the inclined abutment face on the lug 47 engages the pilot lug 39 and the plate 34 is held against further angular movement. The plate 35, which is now acting as the servo plate, however continues to move angularly so that the plates are urged apart to apply the brake. When the lug 47 on the plate 34 engages its stop abutment obth plates tend to rock about that abutment but the plate 35 is cut away adjacent to the pilot lug 42 as shown at 53 in FIGURES 5 and 6 so that the rotational and axial movements of this plate are not impeded by friction between the plate and the pilot lug 42.

When the direction of rotation of the discs is reversed the functions of the two plates are exchanged but the operation is the same.

In a brake in which the discs normally rotate in one direction it will be sufficient to modify only one plate and its stop abutment.

In the arrangement described above the stop abutments are combined with two of the pilot lugs but they may be separate.

Any convenient means may be incorporated for preventing relative transverse movement between the plates while allowing them to move angularly and axially.

The balls and recesses act to a certain extent as spigots but if required one plate may be slidably received within a peripheral axially extending flange on the other.

In the brake shown diagrammatically in FIGURE 7 the plates 55 and 56 are moved angularly in opposite directions to initiate the application of the brake by means of a floating cam 57 operating between abutment surfaces on lugs 58 and 59 on the plates so that there is no radially directed force on the plates. The plates are located by angularly spaced pilot lugs 61, 62, 63. The pilot lug 62 has oppositely inclined end faces adapted to act as stop abutments for lugs 64 and 65 on the respective plates.

If the normal direction of rotation of the brake is anti-clockwise the plate assembly tends to swing about the lug 64 on the plate 55 when the brake is applied and to urge the plates into engagement with the lug 61, and the plate 56, which is the actuating plate, is cut away adjacent to the lug 61 so that the whole or a major part of the reaction is taken by the plate 55.

Preferably the lug 63 is arranged to take a part of the reaction to ensure adequate stability of the brake and prevent floating movement of the plate assembly within the housing.

A steady lug 66 for the plate 56 may be located between the pilot lug 63 and the cam.

In an alternative arrangement a single stationary torque-taking pin of which the axis is parallel to that of the disc may be substituted for the pilot lug 62, the pin acting as a stop abutment for either plate according to the direction of rotation of the brake and also as a pilot.

Our invention is particularly applicable to a brake of the kind set forth in which the axial separation of the plates in the application of the brake is relatively small.

We claim:

1. A disc brake comprising a stationary housing, axially spaced rotatable members within said housing, two co-operating substantially circular angularly movable plates located between the rotatable members, means for urging said plates apart on relative angular movement between them, angularly spaced pilot lugs on said housing with which peripheral portions of the plates are adapted to engage slidably for maintaining said plates substantially central in the housing, a radial projection on one of said plates, and a stop abutment on the housing for co-operation with said radial projection for arresting rotational movement of said plate when it is brought into engagement with a rotatable member of the brake, the peripheral surface of the other plate being cut away on its periphery adjacent to the pilot lug which takes the reaction on the plates due to the plate assembly being caused to swing about the stop abutment by the frictional engagement of the plates with the rotatable members of the brake, whereby there is a reduction of the frictional resistance offered by the pilot lugs to continued rotation of the second plate which acts as a servo member in the application of the brake.

2. A disc brake comprising a stationary housing, axially spaced rotatable members within said housing, two co-operating substantially circular angularly movable plates located between the rotatable members, means for urging said plates apart on relative angular movement between them, angularly spaced pilot lugs on said housing with which peripheral portions of the plates are adapted to engage slidably for maintaining said plates substantially central in the housing, a radial projection on one of said plates, and a stop abutment on the housing for co-operation with said radial projection for arresting rotational movement of said plate when it is brought into engagement with a rotatable member of the brake, the radial projection on the plate and the stop abutment having co-operating surfaces which are inclined with respect to a radius of the brake passing through the abutment, and the peripheral surface of the second plate being cut away adjacent to the pilot lug which takes the reaction on the plates due to the plate assembly being caused to swing about the stop abutment by the frictional engagement of the plates with the rotatable members of the brake, whereby there is a reduction of the frictional resistance offered by the pilot lugs to continued rotation of the second plate which acts as a servo member in the application of the brake.

3. A disc brake comprising a stationary housing, axially spaced rotatable members within said housing, two co-operating substantially circular angularly movable plates located between the rotatable members, means for urging said plates apart into frictional engagement with the rotatable members on relative angular movement between the plates, angularly spaced pilot lugs on said housing with which peripheral portions of the plates are adapted to engage slidably for maintaining said plates substantially central in the housing, a radial projection on each of said plates, and stop abutments on the housing for engagement with said radial projections to arrest rotational movement of one or other of said plates with the rotatable members of the brake according to the direction of rotation of said members while the rotation of the non-arrested plate continues to apply the brake, said radial projections and stop abutments having co-operating surfaces inclined at such angles to radii of the brake passing through the abutments as to reduce the frictional resistance offered by the pilot lugs to continued rotation of the non-arrested pad, and each of said plates being cut away on its periphery adjacent to the pilot lug which takes the reaction on the plates due to the plate assembly being caused to swing about the stop abutment engaged by the arrested plate by the frictional engagement of the plates with the rotatable members of the brake.

4. A disc brake comprising a stationary housing, axially spaced rotatable members within said housing, two cooperating substantially circular movable plates located between the rotatable members, means responsive to a radially acting brake applying force for effecting relative, angular movement between said plates, means responsive to said angular movement for urging said plates axially apart, at least two spaced pilot lugs on said housing with which peripheral portions of the plates are slidably engaged, said pilot lugs being located in positions opposing radial movement of said plates in response to said brake applying force, no more than one radial projection on a plate, and a stop abutment on the housing for cooperation with said radial projection for arresting rotational movement of said plate when it is brought into engagement with a rotatable member of the brake, the radial projection on the arrested plate and the stop abutment having substantially straight cooperating surfaces which are inclined at a pre-determined angle with respect to a radius of the brake passing through the abutment, said angle being selected which produces a pre-determined smaller but positive degree of frictional engagement due to radial reaction of said plates with one of said pilot lugs than with the other.

References Cited by the Examiner
UNITED STATES PATENTS 2,387,039  10/45  Parrett _____ 188—72

MILTON BUCHLER, *Primary Examiner.*

EUGENE G. BOTZ, ARTHUR L. LA POINT,
*Examiners.*